(12) United States Patent
Lowry et al.

(10) Patent No.: US 10,062,162 B2
(45) Date of Patent: Aug. 28, 2018

(54) SYSTEM AND METHOD FOR THE SEGMENTATION OF OPTICAL COHERENCE TOMOGRAPHY SLICES

(71) Applicant: The Charles Stark Draper Laboratory, Inc., Cambridge, MA (US)

(72) Inventors: Nathan Lowry, Malden, MA (US); Peter Lommel, Andover, MA (US); Rami Mangoubi, Newton, MA (US); Richard Wood, Derry, NH (US); Lei Hamilton, Lexington, MA (US); John Irvine, Somerville, MA (US); Stephen Duncan, Winchester, MA (US)

(73) Assignee: THE CHARLES STARK DRAPER LABORATORY, INC., Cambridge, MA (US)

(\*) Notice: Subject to any disclaimer, the term of this patent is extended or adjusted under 35 U.S.C. 154(b) by 10 days.

(21) Appl. No.: 15/296,790

(22) Filed: Oct. 18, 2016

(65) Prior Publication Data

US 2017/0109883 A1 Apr. 20, 2017

Related U.S. Application Data

(60) Provisional application No. 62/243,435, filed on Oct. 19, 2015.

(51) Int. Cl.
*G06K 9/00* (2006.01)
*G06T 7/00* (2017.01)

(52) U.S. Cl.
CPC .......... *G06T 7/0012* (2013.01); *G06T 7/0081* (2013.01); *G06T 2207/10101* (2013.01); *G06T 2207/30041* (2013.01)

(58) Field of Classification Search
CPC .................................................... G06T 7/0012
USPC ........................................................... 382/131
See application file for complete search history.

(56) References Cited

U.S. PATENT DOCUMENTS

2011/0182517 A1\* 7/2011 Farsiu .................. A61B 5/0066
382/190
2013/0183707 A1\* 7/2013 Mangoubi ............... G06F 19/24
435/29

OTHER PUBLICATIONS

Bertelli et al., "Variational Approach to Exploit Prior Information in Object-Background Segregation Application to Retinal Images," Image Processing 2007 ICIP 2007 IEEE International Conference on IEEE P1 Sep. 2007, Sep. 1, 2007.
Chen et al., "Medical Image Segmentation Based on the Bayesian Level Set Method," Aug. 14, 2007 Aug. 1, 2007 Medical Imaging and Informatics 2nd International Conference MIMI 2007 Beijing China Aug. 14-16, 2007.
International Search Report and Written Opinion for PCT/US2016/057522 dated Feb. 17, 2017.

\* cited by examiner

*Primary Examiner* — Raj Chakroborty
(74) *Attorney, Agent, or Firm* — Christopher J. McKenna; Foley & Lardner LLP (57) ABSTRACT

The present disclosure describes a system and method to segment optical coherence tomography (OCT) images. The present system uses a hybrid method that employs both Bayesian level sets (BLS) and graph-based segmentation algorithms. The system first identifies retinal tissue within an OCT image using the BLS algorithms. The identified retinal tissue is then further segmented using the graph-based segmentation algorithms.

20 Claims, 6 Drawing Sheets

SYSTEM AND METHOD FOR THE SEGMENTATION OF OPTICAL COHERENCE TOMOGRAPHY SLICES

CROSS-REFERENCE TO RELATED APPLICATIONS

This application claims the benefit of and priority to U.S. Provisional Patent Application No. 62/243,435 filed on Oct. 19, 2015, which is herein incorporated by reference in its entirety.

BACKGROUND OF THE DISCLOSURE

Optical Coherence Tomography (OCT) is an optical imaging technology that can generate non-invasive, real time, high-resolution cross sectional images of tissue structures. In many implementations, the images captured by OCT device have a micrometer resolution.

OCT devices can generate cross-sectional images of a patient's retina—providing a view of the different retinal layers. The cross-sectional images (also referred to as slices) can be useful in the diagnosis of retinal diseases and also in measuring the efficacy of treatments. In some cases, cross-sectional images near predetermined ocular structures, such as the fovea, can be the most important when making clinical decisions based on the cross-sectional images. The fovea can be important because the fovea includes a concentration of cones and rods.

SUMMARY OF THE DISCLOSURE

In some implementations, each of the layers of an OCT slice needs to be identified for diagnostic purposes. The system and methods described herein can automatically segment selected OCT images of both diseased and healthy retina layers. Features can be calculated for the segmented layers in order to perform procedure outcome prediction, efficacy and re-dosing analysis, and other clinical analysis.

According to one aspect of the disclosure, a system to segment an optical coherence tomography (OCT) image can include one or more processors and a memory. Execution of instructions stored in the memory cause the one or more processors to retrieve, from the memory, an OCT image. The instructions can also cause the one or more processors to classify pixels of the OCT image into a retina class or a non-retina class and identify a border between the retina class pixels and the non-retina class pixels. The instructions can also cause the one or more processors to calculate a weight for each of the pixels of the OCT image and select a portion of the retina class pixels as a search region. The instructions can also cause the one or more processors to identify a boundary of a retina tissue layer through the search region by determining a shortest path through the search area responsive to the weight of each of the pixels in the search area.

In some implementations, the shortest path through the selected portion of the retina class pixels identifies a boundary of one of a subretinal hyper reflective material (SHRM), which can also be referred to as an optical dense matter (ODM) layer; a retina pigment epithelium (RPE) layer; a nerve fiber layer (NFL); and an inner-outer retina (IR/OR) interface. In some implementations, a Bayesian level set based algorithm is used to classify each of the pixels of the OCT image.

In some implementations, the segmentation agent is executed by the automated analysis system to iteratively calculate the graph weight for each of the pixels of the OCT image, select the portion of the retina class pixels as the search region, and determine the shortest path through the selected portion of the retina class pixels responsive to the graph weights of each of the pixels in the selected portion of retina class pixels. During each iteration, the selected portion of the retina class pixels is a different portion of the retina class pixels.

In some implementations, the shortest path of each iteration identifies a different boundary of one of a SHRM layer, a RPE layer, a NFL, and an IR/OR interface. A first iteration identifies a boundary of the SHRM layer, a second iteration identifies a boundary of the RPE layer, a third iteration identifies a boundary of the NFL, and a fourth iteration identifies a boundary of the IR/OR interface. In some implementations, the shortest path is determined using Dijkstra's algorithm.

In some implementations, the segmentation agent is executed by the automated analysis system to preprocess the OCT image. Preprocessing the OCT image can include down-sampling, de-noising, or flattening the OCT image.

According to another aspect of the disclosure, a method of segmenting an optical coherence tomography (OCT) image can include retrieving, by a segmentation agent executed by an automated analysis system comprising one or more processors and a memory, an OCT image. The method can also include classifying pixels of the OCT image into a retina class or a non-retina class. The method can also include identifying, by the segmentation agent, a border between the retina class pixels and the non-retina class pixels. The method can also include calculating, by the segmentation agent, a weight for each of the pixels of the segmented OCT image. The method can include selecting, by the segmentation agent, a portion of the retina class pixels as a search region. The method can include identifying, by the segmentation agent, identify a boundary of a retina tissue layer through the search region by determining a shortest path through the search area responsive to the weight of each of the pixels in the search area.

In some implementations, the shortest path through the selected portion of the retina class pixels identifies a boundary of one of a subretinal hyper reflective material (SHRM) layer, a boundary of a retina pigment epithelium (RPE) layer, a boundary of a nerve fiber layer (NFL), and a boundary of an inner-outer retina (IR/OR) interface.

In some implementations, the method also includes calculating, by the segmentation agent, the graph weight for each of the pixels of the OCT image, selecting, by the segmentation agent, the portion of the retina class pixels as the search region, and determining, by the segmentation agent, the shortest path through the selected portion of the retina class pixels responsive to the graph weights of each of the pixels in the selected portion of retina class pixels.

In some implementations, during each iteration the selected portion of the retina class pixels is a different portion of the retina class pixels. In some implementations, the shortest path of each iteration identifies a boundary of a different one of a SHRM layer, a RPE layer, a NFL, and an IR/OR interface. In some implementations, a first iteration identifies a boundary of the SHRM layer, a second iteration identifies a boundary of the RPE layer, a third iteration identifies a boundary of the NFL, and a fourth iteration identifies a boundary of the IR/OR interface.

In some implementations, the method also includes preprocessing, by the segmentation agent, the OCT image. Preprocessing can include at least one of down-sampling, de-noising, and flattening the OCT image. The shortest path is determined using Dijkstra's algorithm in some implementations.

BRIEF DESCRIPTION OF THE DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale; emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

The present disclosure describes systems and methods for segmenting images, such as OCT images. The segmentation algorithms described herein use a hybrid algorithm to identify retinal tissue within an OCT image and then a graph-based algorithm to segment the retinal tissue. The system uses a Bayesian Level Sets (BLS) segmentation algorithm to segment the OCT images. BLS algorithms are used in two ways. First, BLS algorithms identify the inner limiting membrane (ILM) of the eye and the light penetration layer (corresponding to the depth to which light penetrates the retina across its surface). Together the ILM and the light penetration layer define the retinal tissue within the OCT image. The system also employs BLS algorithms to limit the search region for graph-based retina image segmentation. The graph-based algorithms can further segment the retinal tissue to identify individual layers within the retina—including the subretinal hyper reflective material, the retina pigment epithelium, the nerve fiber layer, and the interface between the inner and outer retina.

Figure 1:
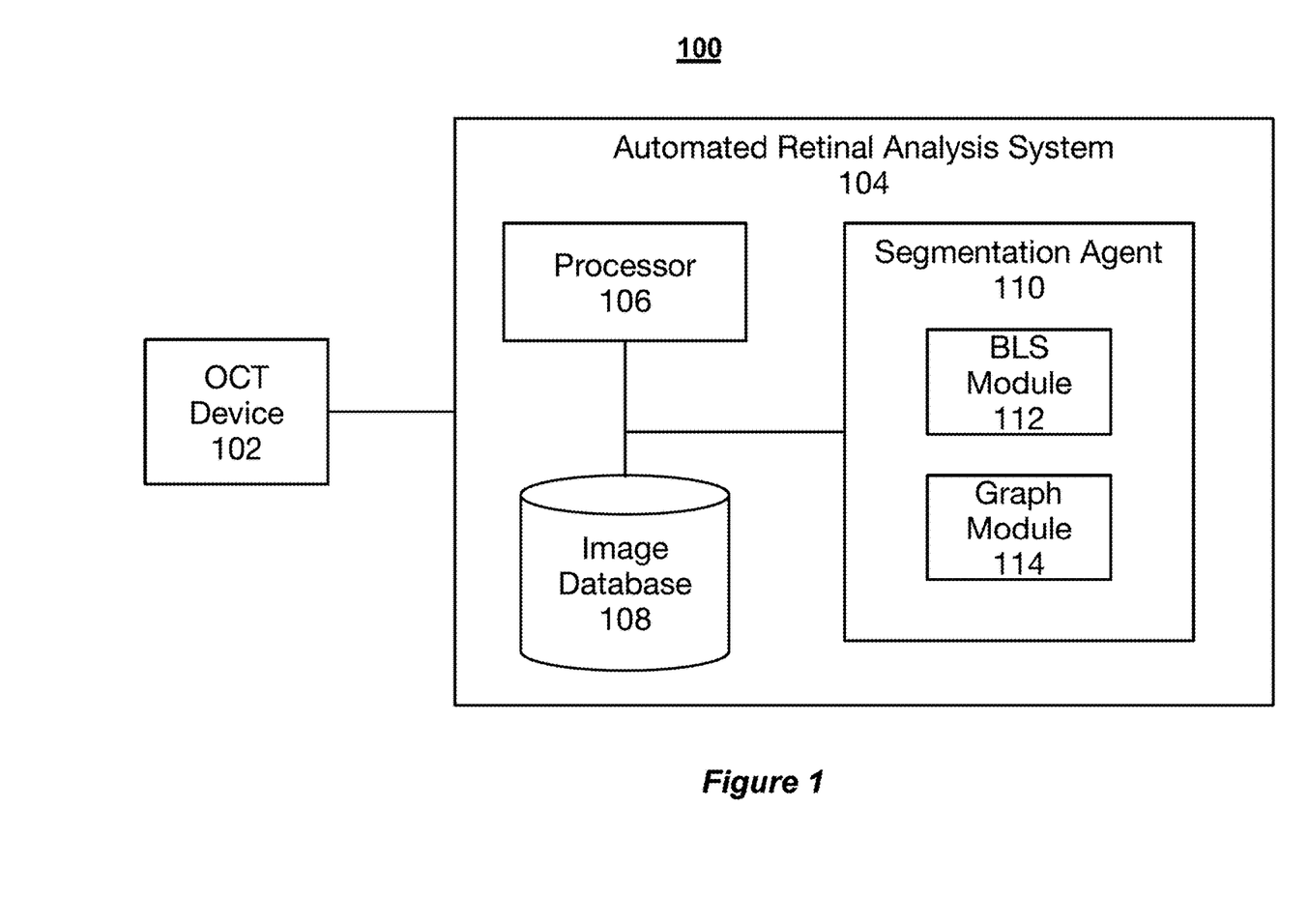
FIG. 1 illustrates an example system for analyzing retinal images.

FIG. 1 illustrates an example system 100 for analyzing retinal images. The system 100 includes an OCT device 102 that is coupled to an automated retinal analysis system (ARAS) 104. The ARAS 104 includes a processor 106 and an image database 108. The ARAS 104 also includes a segmentation agent 110, which includes a Bayesian Level Set (BLS) module 112 and a graph module 114.

The OCT device 102 of the system 100 includes an OCT device 102 that generate the OCT images. The OCT device 102 is a device configured to measure the thickness of tissue, such as the retinal thickness and the retinal nerve fiber layer thickness. The OCT device 118 can be any type of OCT device that generates an OCT image. In general, the OCT device 102 generates a plurality of A-scans of a tissue sample. The A-scans are combined to create cross-sectional images of the tissue sample, which are referred to as B-scan images (or generally, OCT images). In some implementations, the OCT device 102 is located remotely from the ARAS 104. For example, images are captured by the OCT device 102 and transferred to the ARAS 104 over a network, such as the internet. In other implementations, ARAS 104 is located local to the OCT device 102 or may be a component of the OCT device 102.

The ARAS 104 of the system 100 is configured to automatically analyze retinal (and other) OCT images. One automatic analysis feature of the ARAS 104 is the automatic segmentation of tissue samples. For example, the ARAS 104 is configured to segment retinal OCT images to identify boundaries between different layers of tissue in the retinal tissue sample. The thicknesses and other characteristics of the different layers can then be used in medical testing and diagnostics. The methods described herein are executed by the processor 106 of the ARAS 104. In some implementations, the processor 106 of the ARAS 104 is a processor of a general purpose computer executing software. In other implementations, the functions performed by the ARAS 104 are performed by special purpose logic circuitry, such as a field programmable gate array of application specific integrated circuit.

The ARAS 104 includes an image database 108. The image database 108 is configured to store OCT images captured by the OCT device 102. For example, OCT images are captured by the OCT device 102, transferred to the ARAS 104, and then stored in the image database 108 for later analysis. The image database 108 also stores the OCT images once segmented by the ARAS 104. The image database 108 can include or be stored on any type of computer readable medium such a hard drive, solid state drive, or other forms of volatile or non-volatile memory. In some implementations, memory on which the image database 108 is stored also stores computer executable instructions that are executed by the processor 106 to perform the methods described herein.

The ARAS 104 also includes a segmentation agent 110. The segmentation agent 110 is described in greater detail in relation to FIG. 2. Briefly, the segmentation agent 110 includes processor executable instructions executed by the processor 106 or specialty purpose logic circuits to segment images provided to the ARAS 104. The segmentation agent 110 uses a hybrid segmentation algorithm. First, the segmentation agent 110 processes the image with the BLS module 112 to find regions of interest within the image (e.g., the retinal tissue within the OCT image). Then the segmentation agent 110 processes the found regions of interest with the graph module 114 to find boundaries within the features of interest. For example, provided an OCT image of the retina, the BLS module 112 can first identify the inner limiting membrane layer of the eye and the light penetration layer. Together these two features serve as boundaries that define the retinal tissue within the OCT image (e.g., the tissue between the two features). The boundaries are used to limit the search region for graph-based retina image segmentation performed by the graph module 114.

The graph module 114 can identify, for example, the subretinal hyper reflective material (SHRM) region, the retina pigment epithelium (RPE) layer, the nerve fiber layer (NFL), the inner-outer retina (IR/OR) interface, or another interface between tissue layers in the retina. In some implementations, the SHRM is also referred to as the Optical Dense Matter (ODM). Graph-based algorithms can express each pixel of a structure as a graph. When segmenting the retinal tissue with a graph-based algorithm, each pixel of the OCT image acts as a node. Adjacent nodes are connected by edges. Boundaries are found along edges with similar intensities and strong gradients.

Figure 2:
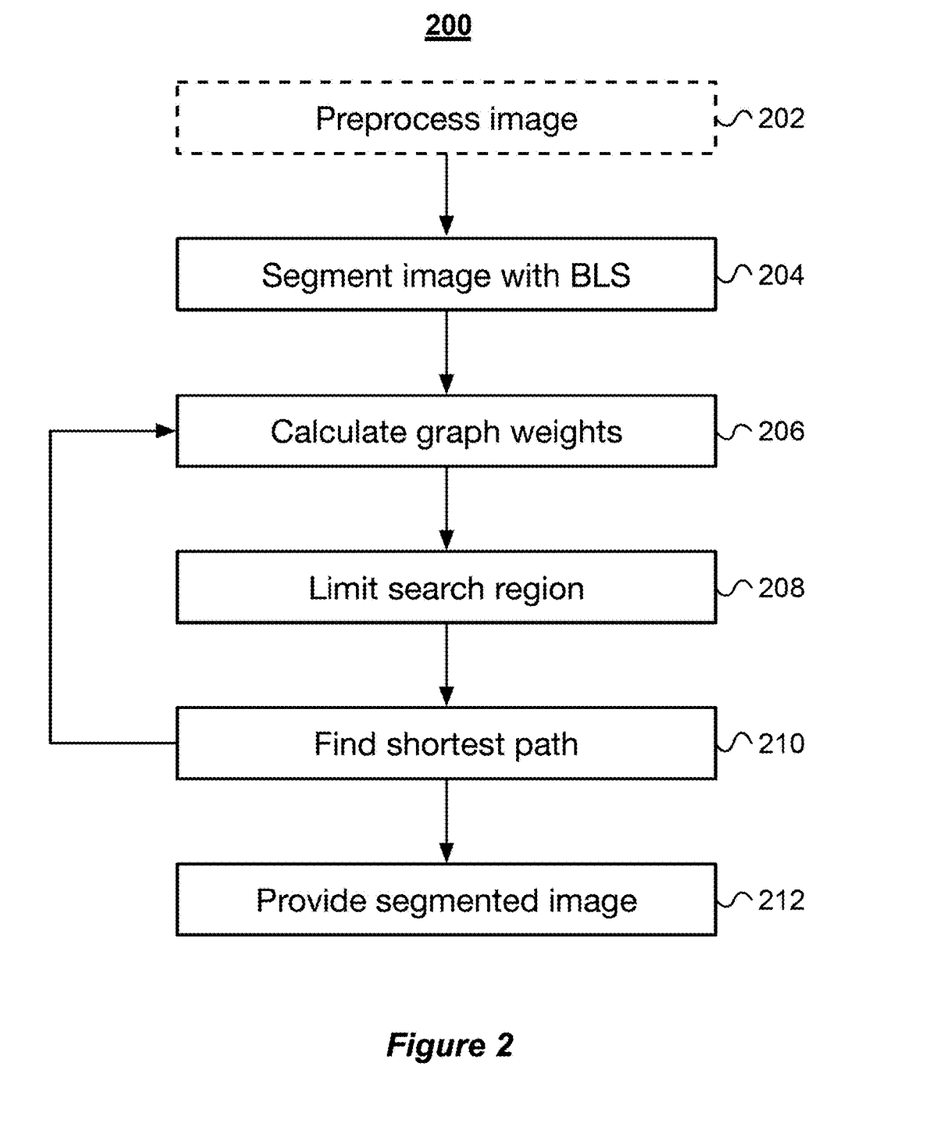
FIG. 2 illustrates a flow diagram of an example method for segmenting an OCT image using the example system illustrated in FIG. 1.

FIG. 2 illustrates a block diagram of an example method 200 for segmenting an OCT image. In some implementations, the method 200 includes the optional step of preprocessing the OCT image (step 202). The method 200 includes segmenting the OCT image with a Bayesian level set algorithm to set initial bounding areas for segmentation (step 204). Graph weights based on the image gradients are then calculated (step 206). A search for boundaries is then limited to a specific region (step 208), and the shortest path through the region is found (step 210). Steps 206-210 are then iterated through a predetermined number of times. During each iteration, the search region can be changed to search for a different tissue layer boundary, and the shortest path can be found through each of the new regions. Then the segmented image is provided (step 212).

In some implementations, the method 200 begins with preprocessing the OCT image (step 202). In the preprocessing stage, the OCT image can be down-sampled, de-noised, flattened, or any combination thereof. In some implementations, the OCT image is down-sampled to reduce the total number of pixels within the image, which reduces the computational load in segmenting the OCT image. The OCT image can be down-sampled by 10%, 20%, 30%, 40%, 50%, 60%, 70%, or 80%. De-noising the OCT image smooths and reduces speckling that might be present in the OCT image. In some implementations, de-noising is implemented by applying a Gaussian filter to the OCT image. In some implementations, the Gaussian filter uses a window between about 5 and about 20 pixels, about 5 and about 15 pixels, or about 5 pixels and about 10 pixels to smooth the OCT image. In other implementations, the de-noising is implemented by applying a median filter, through total variation de-noising, or by applying a shock filter.

Figure 3A:
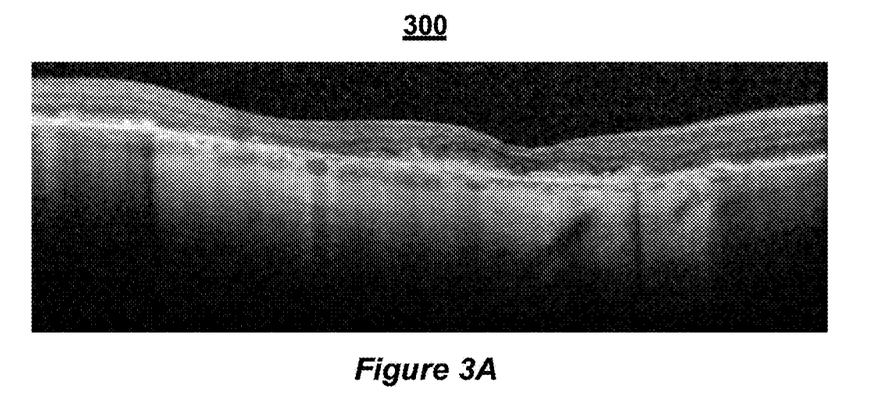
FIG. 3A illustrates an original OCT image.
Figure 3B:
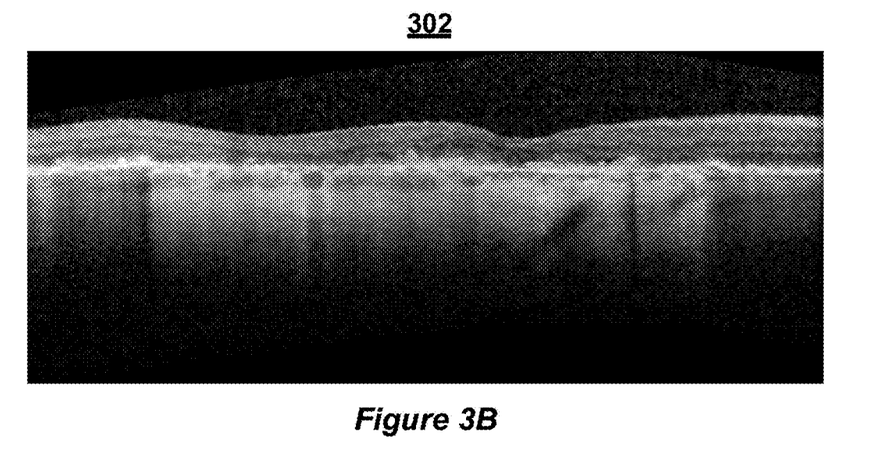
FIG. 3B illustrates a flattened OCT image generated from the OCT image illustrated in FIG. 3A.

In some implementations, the step 202 includes flattening the OCT image. As the OCT image is a cross-sectional image of the back portion of the eye, the retinal tissue is curved and forms a convex shape in the OCT image. Flattening the curvature of the tissue can improve the segmentation of the retinal tissue. Flattening the image corrects for the image angle and the curved shape of the eye. Flattening the image linearizes the tissue within the image. In some implementations, the OCT image is flattened by finding a convex hull of the OCT image using a binary mask. The bottom of the convex hull corresponds to the curvature of the eye. The bottom of the convex hull is flattened to flatten the curvature of the retinal tissue. FIG. 3A illustrates an original OCT image 300, and FIG. 3B illustrates a flattened OCT image 302, which was generated from the OCT image 300.

As set forth above, the example method 200 includes segmenting an OCT image with a BLS algorithm (step 204). The BLS algorithm segments the OCT image to identify the pixels within the OCT image that correspond to retinal tissue. The boundaries generated by the BLS algorithm generate two classes of pixels: pixels that correspond to retinal tissue and pixels that correspond to non-retinal tissue. In some implementations, segmentation of the OCT image with the BLS algorithm identifies the retinal tissue as the tissue between the inner limiting membrane (ILM) and the light penetration layer. The BLS algorithm is implemented in an iterative, two-stage algorithm similar to a finite mixture model with expectation maximization. In the first stage, for each iteration k an initial segmentation decision is made for each pixel of the OCT image. The initial segmentation decision is an iterative process for estimating a classification Z of each pixel based on Y observations at any given pixel having parameters Θ. The initial classification of the probability (q) of a pixel (x) belonging to a class Z based on data Y is based on Bayes' Rule:

$$q^k_{Z|Y}(x) = \frac{q^k_{Y|Z}(x) q^k_Z(x)}{\sum_{c \in C} q^k_{Y|Z}(x) q^k_c(x)} \qquad \text{eq. 1}$$

Then the likelihood of the observations Y conditioned on the class Z ($q_{Y|Z}$) is updated. This likelihood is modeled as a probability density function with parameters Θ. Updating the likelihood for the next iteration k+1 therefore requires updating Θ based on maximum likelihood as follows:

$$\Theta^{k+1}_Z = \arg\max \left( \sum_{x \in \Omega} q^k_{Z|Y}(x) \log P(Y(X); \Theta) \right) \qquad \text{eq. 2}$$

Then, the prior likelihood of a given class $q_Z$ is updated by smoothing the probability from the past iteration k with a smoothing function:

$$q_Z^{k+1} = S(q_{Z|Y}^k(x)) \qquad \text{eq. 3}$$

The smoothing is performed via a flow-by-curvature function:

$$q^k_Z(x) = \left(1 + e^{-L^{k-1}_x(1,x)}\right)^{-1} \qquad \text{eq. 4}$$

$$L^k_Z(0, x) = \log \frac{q^{k-1}_{Z|Y}(x)}{1 - q^{k-1}_{Z|Y}(x)}$$

$$L^k_Z(t, x) = \beta \kappa(L^k_Z(t, x))$$

$$\kappa = \nabla \cdot \frac{\nabla \phi(x)}{\|\nabla \phi(x)\|}$$

In the above equations, β is a weight that determines the level of smoothing. When updating the parameters, the smoothing function smooths the boundary between classes to create a smooth, regular, and connected boundary. The two-stages of the algorithm can be repeated a predetermined number of times to refine the classification of each pixel.

Observations Y are the image data at any given pixel, and may include the image intensity, parameters, or statistics derived from the OCT image, such as power spectral density, wavelet density, and intensity. For example, Y can be the image intensity and is modeled using a Gaussian distribution. In such an example, the parameters Θ are therefore the mean and variance of the Gaussian density.

Figure 4:
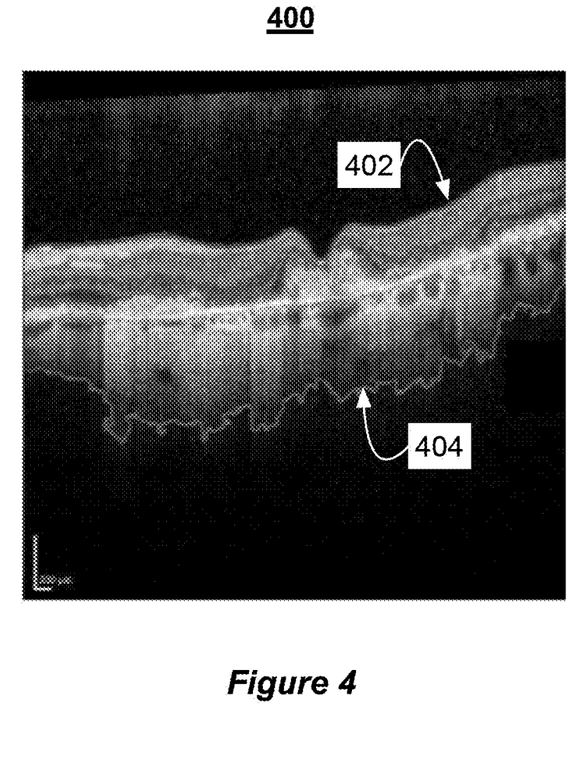
FIG. 4 illustrates an example OCT image partially processed with the method illustrated in FIG. 2.

FIG. 4 illustrates an example OCT image 400 processed with the above described BLS algorithm. The BLS algorithm identifies the retinal tissue by identifying the inner limiting membrane and the light penetration layer. The portion of the image between the inner limiting membrane and the light penetration layer corresponds to the retinal tissue. As illustrated, the BLS algorithm places a first boundary 402 along the inner limiting membrane and a second boundary 404 along the light penetration layer. The locations of the pixels corresponding to the first boundary 402 and the second boundary 404 are stored as an array or other structure in the image database 108 for future processing.

Figure 5A:
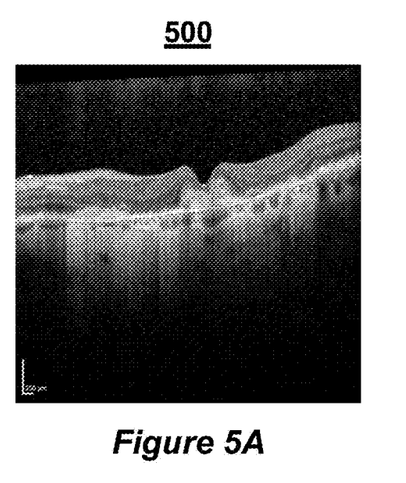
FIG. 5A illustrates an initial OCT image.
Figure 5B:
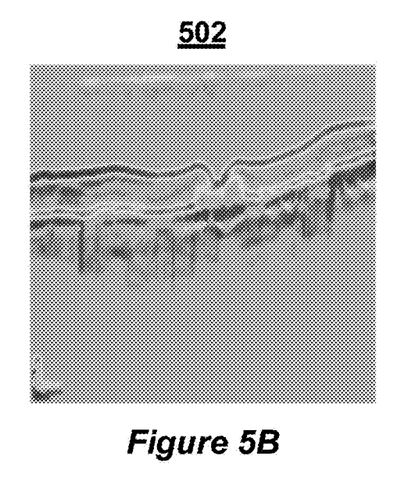
FIG. 5B illustrates a filtered OCT image generated by filtering the OCT image illustrated in FIG. 5A.

Referring back to FIG. 2, the example method 200 continues with the calculation of graph weights for each of the pixels in the OCT image (step 206). The graph weights for each pixel are calculated based on the image gradients of the pixels. In some implementations, light to dark gradients are used and in other implementations dark to light gradients are used. In some implementations, relatively large gradient magnitudes indicate edges or boundaries within an image. The gradients can be calculated with a number of methods, such as, but not limited to, column-wise forward differences, central differences, derivative-of-Gaussian filters, edge filters, and steerable edge filters (SEF). A column-wise central differences process can average the forward and backwards differences at each pixel. In some implementations, the column-wise central differences process method has the advantage of being computationally simple. A column-wise derivation-of-Gaussian filter can convolve Gaussian smoothing filters with forward differences. In some implementations, this method is used for noisy OCT images because the method rejects noise relatively well. A vertical edge filter can convolve the image with two different filters—for example, one along the x-axis and one along the y-axis. Steerable edge filters can convolve the image with two rotated filters. Steerable edge filters are relatively good a noise rejection and tuning. FIG. 5A illustrates an initial OCT image 500 and FIG. 5B illustrates a filtered OCT image 502, which is the OCT image 500 filtered with a SEF.

In the graph based segmentation algorithm, each pixel of the OCT image is treated as a node. Adjacent pixels (e.g., nodes) are connected by edges. Each edge is given a graph weight, which is a measure of the similarity between neighboring nodes. In some implementations, the graph weights are calculated as:

$$w_{ab} = [2 - (g_a + g_b)] + \lambda |i_a - i_b| + w_v + w_{min} \qquad \text{eq. 5}$$

where $g_a$ and $g_b$ are the gradients of the nodes a and b, $i_a$ and $i_b$ are the intensity of the nodes a and b, $w_v$ is a weighting factor for the vertical movement, and $w_{min}$ is the minimum weight added to ensure that equation 5 is positive. The $w_v$ weighting factor acts as a vertical penalty that increases the graph weight between pixels oriented vertically from one another in order to prevent unnecessary vertical movement in the computed boundary. In some implementations, the vertical penalty increases a graph weight when the nodes a and b are outside an assumed location. For example, if a boundary is assumed to be within 20 pixels of a reference line, the vertical penalty is increased for pixels more than 20 pixels above or below the reference line. In some implementations, vertical penalty is a function that increases in severity as the distance from a reference line increases.

The iterative steps of the method 200 also include limiting the search region of the OCT image (step 208). In some implementations, the graph-based algorithms used in step 210 return better results when provided spatial heuristics or are provided specific regions in which to search. In some implementations, the search regions are limited based on the biology of the eye. For example, the average layer thicknesses can be used to estimate regions that most likely include boundaries. In some cases, the search region can be limited so that the segmentation method can include finding specific layers in a defined order. Iteratively limiting the search region and then finding the shortest path through the search region in a predetermined order enables information about the location of boundaries found in previous iterations to be used in finding the boundary through the current search region. In some implementations, the predetermined order includes finding the boundaries in the order of SHRM, RPE, NFL, and IR/OR. In an example of finding the boundaries in a predetermined order and limiting the search region by using the boundaries found in previous iterations (and after finding the retinal tissue in the OCT image using the BLS algorithms), the search region for the SHRM border can be limited by searching between the segmenting lines that denote the ILM and the light penetration line. Next, to find the RPE, the segmentation algorithm may look for the RPE in the OCT image in a region between the SHRM border and the light penetration line. The NFL can then be searched for between the ILM and the SHRM border. The search for the IR/OR interface can be limited to the region between the ILM and NFL.

In some implementations, the step of limiting the search region (step 208) is performed prior to calculating the graph weights (step 206). Limiting the search regions prior to performing the graph weight calculations can reduce the computational requirements and also enable the gradients to be normalized over only the regions of interest rather than the whole OCT image.

During each iteration, once the search region is limited, the boundary between layers is found by finding the shortest path (or substantially the shortest path) through the search region (step 210). In finding the shortest path through each search region a graph-based segmentation algorithm is used. The graph-based segmentation algorithm generates a path along the boundary between different tissue layers. In some implementations, the path is found using Dijkstra's algorithm. For example, the graph-weight can be analogized to a distance between neighboring nodes. Dijkstra's algorithm can then be used to find the shortest distance through the search region. In some implementations, the search algorithm finds boundaries between nodes with relatively high difference in their gradients, a relatively low difference in their intensities, and relatively low amounts of vertical movement.

Figure 6:
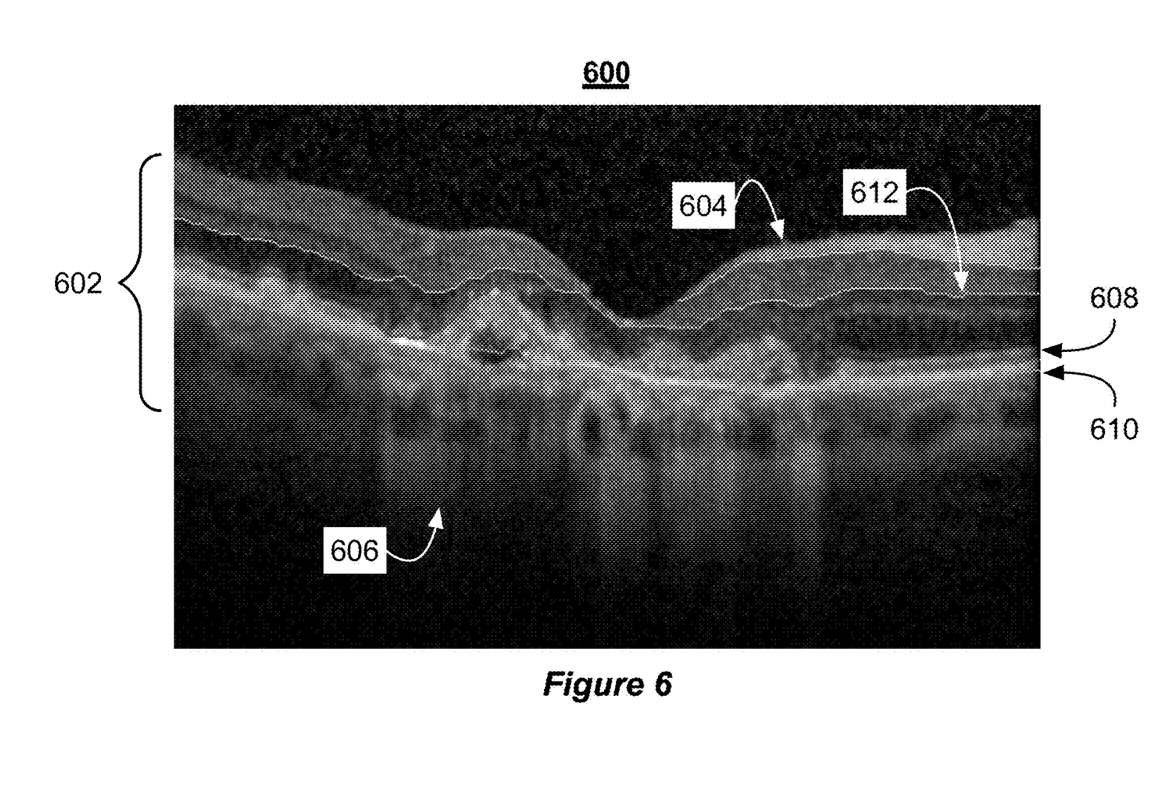
FIG. 6 illustrates an OCT image segmented with the method illustrated in FIG. 2.

After a predetermined number of iterations, the method 200 provides the segmented image (step 212). In some implementations, the segmented OCT image is used to assess and diagnose the retina. For example, the segmented OCT image can be used for outcome prediction, efficacy and re-dosing analysis, and other clinical analysis. FIG. 6 illustrates an OCT image 600 that was segmented using the method 200. The OCT image 600 illustrates that the retinal tissue 602 was found and defined between the ILM 604 and the light penetrating layer 606. The method 200 also identified the SHRM boundary 608, the RPE boundary 610, and the IR/OR interface 612.

As described above, the method 200 is a hybrid algorithm based on BLS algorithms and graph-based algorithms. Steps 206-210 of the method 200 correspond to the graph-based steps of the hybrid algorithm. As one example of the iterative steps 206-210 of method 200, having identified the pixels in the OCT image corresponding to the retinal tissue in step 204, the portion of the OCT image corresponding to the retinal tissue is iteratively segmented to identify the layers within the retinal tissue. In a first iteration of step 206, the dark to light gradients are found with a SEF ($\sigma=\frac{1}{2}$). In some implementations, $\sigma$ is tuned to between about 0.25 and about 2 for different OCT images. In the first iteration of step 208, the search region is limited by removing the ILM convex hull and by removing the central 4 pixels and the exterior 20 pixels of the OCT image (or the number of pixels corresponding about 160 μm of the retina tissue). The SHRM border is then found in the limited search region using the above described shortest path algorithm. Next to find the RPE, the graph weights are recalculated by filtering the OCT image to generate the light to dark gradients with a SEF ($\sigma=\frac{1}{2}$). The search region is the limited to a region within a boundary of 20 pixels below the SHRM border when segmenting the slice to find the RPE. In the next iteration, where the NFL is found, the light to dark gradients are recalculated using a SEF ($\sigma=\frac{1}{2}$). The search region is limited to between the ILM and the SHRM border. In a final iteration, the dark to light gradients are calculated with a SEF ($\sigma=1$). The search region for the IR/OR is limited between the ILM and NFL.

The disclosed system and methods may be embodied in other specific forms without departing from the spirit or essential characteristics thereof. The forgoing implementations are therefore to be considered in all respects illustrative, rather than limiting of the invention.

CONCLUSION

As used herein, the term "about" and "substantially" will be understood by persons of ordinary skill in the art and will vary to some extent depending upon the context in which it is used. If there are uses of the term which are not clear to persons of ordinary skill in the art given the context in which it is used, "about" will mean up to plus or minus 10% of the particular term.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one" in reference to a list of one or more elements should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03

It will be apparent to those skilled in the art that various modifications and variations can be made in the methods of the present invention without departing from the spirit or scope of the invention. Thus, it is intended that the present invention cover the modifications and variations of this invention provided they come within the scope of the appended claims and their equivalents. All publicly available documents referenced herein, including but not limited to U.S. patents, are specifically incorporated by reference.

What is claimed:

1. A system to segment an optical coherence tomography (OCT) image, the system comprising one or more processors and a memory, wherein execution of instructions stored in the memory cause the one or more processors to:
   retrieve, from the memory, an optical coherence tomography (OCT) image;
   identify a first boundary representing an inner limiting membrane in the OCT image with a Bayesian level set based algorithm;
   identify a second boundary representing a light penetrating layer in the OCT image with the Bayesian level set based algorithm;
   classify a first portion of pixels of the OCT image between the first boundary and the second boundary into a retina class and a second portion of the pixels of the OCT image into a non-retina class;

calculate a weight for each of the first portion of pixels of the OCT image;

select the first portion of pixels of the OCT image as a search region;

identify a boundary of a retina tissue layer through the search region by determining a shortest path through the search region responsive to the weight of each of the pixels in the search region; and generate a segmented OCT image based at least on the boundary of the retina tissue layer through the search region, the first boundary representing the inner limiting membrane, and the second boundary representing the light penetrating layer.

2. The system of claim 1, wherein the shortest path through the selected portion of the retina class pixels identifies a boundary one of a subretinal hyper reflective material (SHRM) layer, a retina pigment epithelium (RPE) layer, a nerve fiber layer (NFL), or an inner-outer retina (IR/OR) interface.

3. The system of claim 1, wherein execution of the instructions stored in the memory cause the one or more processors to classify each of the pixels with the Bayesian level set based algorithm.

4. The system of claim 1, wherein execution of the instructions stored in the memory cause the one or more processor to iteratively:

calculate the weight for each of the first portion of pixels of the OCT image;

select a sub-portion of the retina class pixels as the search region; and determine the shortest path through the search region responsive to the weight of each of the pixels in the search region.

5. The system of claim 4, wherein during each iteration the selected sub-portion of the retina class pixels is a different portion of the retina class pixels.

6. The system of claim 4, wherein the shortest path of each iteration identifies a different boundary of one of a subretinal hyper reflective material (SHRM) layer, a RPE layer, a NFL, or an IR/OR interface.

7. The system of claim 6, wherein a first iteration identifies a boundary of the SHRM layer, a second iteration identifies a boundary of the RPE layer, a third iteration identifies a boundary of the NFL, and a fourth iteration identifies a boundary of the IR/OR interface.

8. The system of claim 1, wherein the wherein execution of the instructions stored in the memory cause the one or more processor to preprocess the OCT image.

9. The system of claim 8, wherein preprocessing comprises at least one of down-sampling, de-noising, or flattening the OCT image.

10. The system of claim 1, wherein the shortest path is determined using Dijkstra's algorithm.

11. A method of segmenting an optical coherence tomography (OCT) image, the method comprising:

retrieving, by a segmentation agent executed by one or more processors coupled to a memory, an OCT image;

identifying, by the segmentation agent, a first boundary representing an inner limiting membrane in the OCT image with a Bayesian level set based algorithm;

identifying, by the segmentation agent, a second boundary representing a light penetrating layer in the OCT image with the Bayesian level set based algorithm;

classifying, by the segmentation agent, a first portion of pixels of the OCT image between the first boundary and the second boundary into a retina class and a second portion of the pixels of the OCT image into a non-retina class;

calculating, by the segmentation agent, a weight for each of the first portion of pixels of the segmented OCT image;

selecting, by the segmentation agent, the first portion of pixels of the OCT image as a search region;

identifying, by the segmentation agent, a boundary of a retina tissue layer through the search region by determining a shortest path through the search region responsive to the weight of each of the pixels in the search region; and generating, by the segmentation agent, a segmented OCT image based at least on the boundary of the retina tissue layer through the search region, the first boundary representing the inner limiting membrane, and the second boundary representing the light penetrating layer.

12. The method of claim 11, wherein the shortest path through the selected portion of the retina class pixels identifies a boundary of one of a subretinal hyper reflective material (SHRM) layer, a retina pigment epithelium (RPE) layer, a nerve fiber layer (NFL), or an inner-outer retina (IR/OR) interface.

13. The method of claim 11, further comprising classifying each of the pixels with the Bayesian level set based algorithm.

14. The method of claim 11, further comprising iteratively:

calculating, by the segmentation agent, the weight for each of the first portion of pixels of the OCT image;

selecting, by the segmentation agent, a sub-portion of the retina class pixels as the search region; and determining, by the segmentation agent, the shortest path through the search region responsive to the weight of each of the pixels in the search region.

15. The method of claim 14, wherein during each iteration the selected sub-portion of the retina class pixels is a different portion of the retina class pixels.

16. The method of claim 14, wherein the shortest path of each iteration identifies a different boundary of one of a subretinal hyper reflective material (SHRM) layer, a RPE layer, a NFL, or an IR/OR interface.

17. The method of claim 16, wherein a first iteration identifies a boundary of the SHRM layer, a second iteration identifies a boundary of the RPE layer, a third iteration identifies a boundary of the NFL, and a fourth iteration identifies a boundary of the IR/OR interface.

18. The method of claim 11, further comprising preprocessing, by the segmentation agent, the OCT image.

19. The method of claim 18, wherein preprocessing comprises at least one of down-sampling, de-noising, or flattening the OCT image.

20. The method of claim 11, wherein the shortest path is determined using Dijkstra's algorithm.

* * * * *